(12) United States Patent
Meyer

(10) Patent No.: US 6,773,026 B2
(45) Date of Patent: Aug. 10, 2004

(54) AIRBAG ARRANGEMENT

(75) Inventor: Bernhard Meyer, Munich (DE)

(73) Assignee: Autoliv Development AB, Vargarda (SE)

(*) Notice: Subject to any disclaimer, the term of this patent is extended or adjusted under 35 U.S.C. 154(b) by 119 days.

(21) Appl. No.: 10/213,432

(22) Filed: Aug. 7, 2002

(65) Prior Publication Data

US 2003/0030256 A1 Feb. 13, 2003

(30) Foreign Application Priority Data

Aug. 7, 2001 (GB) .............................................. 0119250

(51) Int. Cl.⁷ .............................................. B60R 21/22
(52) U.S. Cl. .................. 280/729; 280/730.2; 280/743.2
(58) Field of Search .......................... 280/730.2, 743.1, 280/743.2, 729, 730.1

(56) References Cited

U.S. PATENT DOCUMENTS 3,774,936 A 11/1973 Barnett et al.
5,322,326 A * 6/1994 Ohm ........................ 280/743.1
5,470,103 A 11/1995 Vaillancourt et al.
5,540,459 A * 7/1996 Daniel ..................... 280/730.2
5,988,735 A * 11/1999 Muller .................... 280/730.2

FOREIGN PATENT DOCUMENTS

DE          10038087 A1 *  2/2002  ........... B60R/21/22
EP          0 810 128 A2   12/1997
JP          10-264761 A    10/1998

* cited by examiner

Primary Examiner—Peter C. English
(74) Attorney, Agent, or Firm—Venable LLP; Catherine M. Voorhees

(57) ABSTRACT

An airbag arrangement for a motor vehicle includes an inflatable element having two opposed side faces. Mounting straps extend from each side face to mounting points provided in the roof of the motor vehicle. The mounting points are spaced apart transversely. When inflated the inflatable element extends down from the roof of the motor vehicle to be located between heads of the occupants of two adjacent seats. Part of the inflatable element between the straps is in contact with the roof and the straps associated with each side face are tensioned so that the airbag is held firmly in position.

11 Claims, 5 Drawing Sheets

US 6,773,026 B2

AIRBAG ARRANGEMENT

CROSS REFERENCE TO RELATED APPLICATION

This application claims the priority of British Application No. 0119250.9 filed Aug. 7, 2001.

BACKGROUND OF THE INVENTION

The present invention relates to an airbag arrangement and more particularly relates to an airbag arrangement comprising an inflatable element centrally mounted between two front or two rear seats in a motor vehicle.

It has been previously proposed to provide an inflatable element comprising a roof mounted airbag or an inflatable curtain which is centrally mounted between two front or two rear seats in a motor vehicle. In an accident such as a side impact or rollover, the inflatable curtain will inflate downwardly to extend between the two seats and some protection will be provided by the inflatable element for the occupant or occupants of the vehicle.

However, previous centrally mounted airbags or inflatable curtains have had insufficient rigidity when inflated in that, when an occupant of one seat, in a side impact, impacts with the inflated airbag or inflatable curtain, the airbag or inflatable curtain will move away from the person occupying the seat and therefore will not provide the required degree of protection. When both seats are occupied, if the airbag or inflatable curtain moves away from one occupant, there is a high risk that the airbag or curtain will move out of contact with the occupant such that the occupant impacts with an occupant of the adjacent seat. Also, if one seat is occupied and the adjacent seat is unoccupied, the impact of the occupant of the one seat with the inflatable element may move the inflatable element to a position where the occupant is no longer in contact with the inflatable element and the required degree of protection is not provided by the inflatable element.

SUMMARY OF THE INVENTION

The present invention aims to provide an improved airbag arrangement.

According to this invention there is provided an airbag arrangement in a motor vehicle, the airbag arrangement comprising an inflatable element having two opposed side faces, each side face being provided with mounting means at least at points spaced apart axially of the vehicle along the inflatable element, and which extend to mounting points in the roof of a motor vehicle between two adjacent seats of the motor vehicle, the mounting points being transversely spaced apart, the arrangement being such that, when inflated, the inflatable element extends down from the roof of the motor vehicle with part of the inflatable element between the mounting points in contact with part of the roof of the vehicle, the inflatable element contacting the roof so that the mounting means associated with each side face are tensioned.

Preferably the mounting means comprises at least two elongate straps, each strap having two opposed ends, each end being mounted on a respective mounting point in the roof of the vehicle, a central part of each strap being secured to part of the inflatable element.

Conveniently the straps extend across the top of the inflatable element when the inflatable element is in the inflated condition.

Advantageously the straps extend around the bottom of the inflatable element when the inflatable element is in an inflated condition.

Preferably each end of each strap is provided with a mounting eye and each mounting point in the roof of the vehicle comprises a mounting lug on which a respective mounting eye is secured.

Conveniently the opposed side faces of the inflatable element are interconnected by means comprising at least one join line which defines the plurality of regions in the form of a plurality of cells.

Advantageously the opposed side faces are interconnected by means comprising at least one elongate tether extending between the two opposed side faces.

In a preferred embodiment the inflatable element is formed from a rectangular sheet of fabric folded about an axis to form two fabric halves, the two fabric halves being secured together about their periphery.

Preferably the halves are secured together by stitching.

Alternatively the halves are secured together by welding.

Alternatively the halves are secured together using adhesive.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
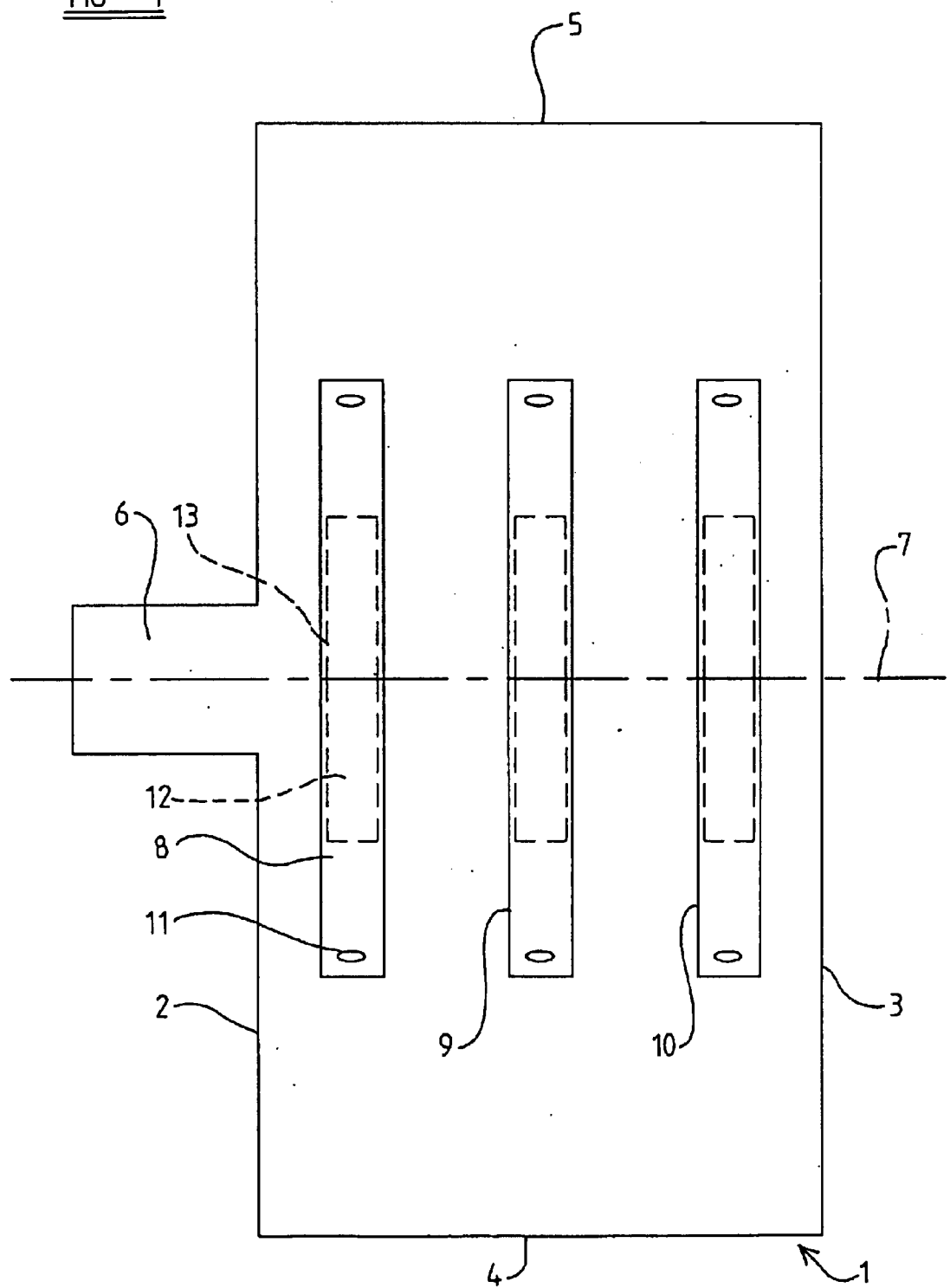
FIG. 1 is a plan view of a component used to fabricate one embodiment of an inflatable element of the present invention with part of the component shown in phantom.

Referring initially to FIG. 1, a rectangular sheet of airbag fabric 1 is provided comprising two relatively long opposed parallel edges 2 and 3 and two relatively short opposed parallel edges 4 and 5, each adjacent edge being perpendicular to one another.

A tab 6 extends substantially perpendicularly from the first relatively long edge 2 in a direction parallel to the short edges 4 and 5. The tab 6 is located at a position equidistant between the two relatively short opposed edges 4 and 5.

A fold line 7 extends across the sheet 1 from the first relatively long edge 2 to the second relatively long edge 3 so that the fold line 7 is located at a position equidistant between the two short edges 4 and 5. The fold line is thus aligned with the axis of the tab 6.

Mounting means in the form of three straps 8,9,10 are provided, each strap 8,9,10 comprising an elongate strip of material having two opposed ends. The straps are of equal length. Each opposed end is provided with a mounting eye 11, the purpose of which will become clear hereinafter. A central region 12 between the opposed ends of each strap 8,9,10 is mounted on a central part of the inflatable element between the relatively short edges 4 and 5 such that the straps 8,9,10 are spaced evenly apart along the fold line 7. The central region 12 of each strap is secured to the fabric sheet by stitching, adhesive or welding as shown by dashed lines 13. Each central region 12 is of the same length. Thus the central region 12 of each strap 8,9,10 is secured to the fabric sheet with the opposed ends and mounting eyes 11 of each strap 8,9,10 being loose. Each strap extends perpendicularly to the fold line, with the fold line being aligned with the centre of the strap. The ends of the straps do not extend as far as the short edges 4 and 5.

The inflatable element is formed by folding the sheet 1 about the fold line 7. The parts of the sheet 1 on either side of the fold line 7 are then secured together about their periphery as shown by dashed line 14 in FIG. 2. This is achieved by stitching, gluing or welding as is well known in the art. It is to be appreciated that any other suitable method may alternatively be used. Thus, the inflatable element is formed with an interior cavity defined below the fold line 7 as shown in FIG. 2.

A gas duct 15 is defined by folding the tab 6 about the fold line 7 and securing the lower edge of the parts of the tab 6 below the fold line together. The gas duct communicates within the chamber defined by the folded sheet 1.

Figure 2:
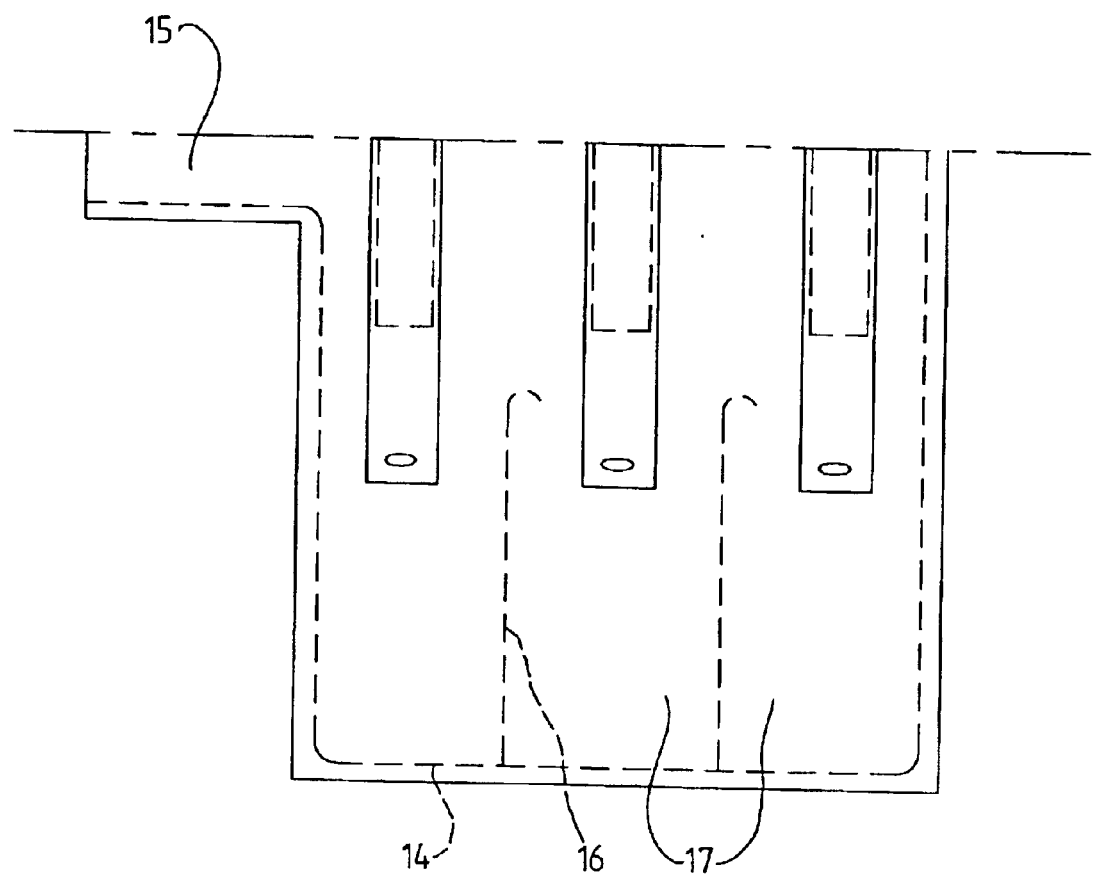
FIG. 2 is a side view of the inflatable element of FIG. 1 when assembled with part of the inflatable element shown in phantom.

As can be seen from FIG. 2, the parts of the sheet 1 on either side of the fold line 7 are further interconnected to define a plurality of regions in the form of cells 17 extending from a region formed in an upper part of the inflatable element 1 adjacent the fold line 7 which communicates with the gas duct to the lower edge of the inflatable element remote from the fold line 7. The cells 17 are defined by stitching, welding or bonding together the parts of the sheet 1 as shown by dashed lines 16.

Figure 3:
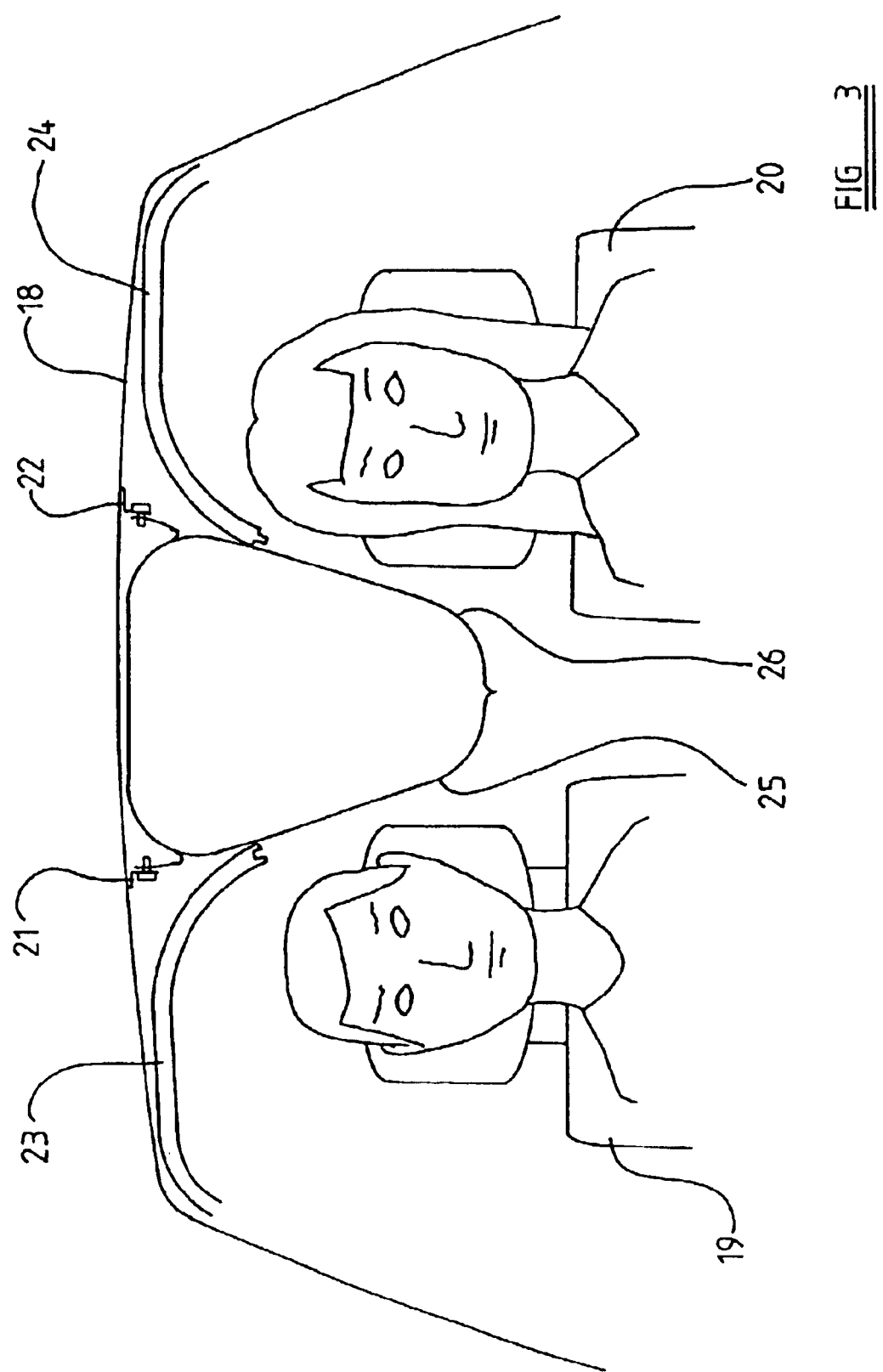
FIG. 3 is a part sectional front view of the inflatable element of FIG. 1 when mounted in a motor vehicle, with the inflatable element in an inflated condition.

Referring now to FIG. 3, the inflatable element is shown mounted in the roof 18 of a motor vehicle between two adjacent seats 19 and 20. A first set of mounting bolts or mounting lugs 21 are spaced apart axially of the vehicle in a part of the roof 18 of the vehicle adjacent the first seat 19. A second set of mounting bolts or mounting lugs 22 are spaced apart axially of the vehicle in a part of the roof 18 of the vehicle adjacent the second seat 20. The first set of lugs 21 are spaced apart from one another by a distance corresponding to the spacing of the straps 8,9,10. The second set of lugs 22 are similarly spaced apart. It is to be appreciated that the first set of mounting lugs 21 are transversely spaced apart from the second set of mounting lugs 22 in the roof 18 of the vehicle by a predetermined distance.

The inflatable element is mounted in the roof 18 of the motor vehicle by securing the mounting eye 11 on a first end of each strap 8,9,10 to the first set of mounting lugs 21 and by mounting the mounting eye 11 on the second opposed end of each strap 8,9,10 to the second set of mounting lugs 22. Thus, the first end of each strap is transversely spaced apart by a predetermined distance from the second end of the strap. The central region 12 of each strap extends across the top of the inflatable element between the first and second set of mounting lugs 21 and 22.

When uninflated (not shown), the inflatable element is folded to a position adjacent the roof 18 of the motor vehicle and the uninflated inflatable element is concealed behind deformable roof portions 23,24 provided in a head lining of the motor vehicle. It is to be appreciated that, when so mounted, the gas duct 15 of the inflatable element is connected to a gas generator (not shown) such that in an accident situation, gas will flow from the gas generator, through the gas duct 15 and into the chamber defined by inflatable element.

In a side impact or rollover situation, the inflatable element inflates downwardly from the roof 18 of the motor vehicle. The downward inflation of the inflatable element deforms the deformable roof portions 23 and 24 forming part of the head lining of the vehicle such that the inflatable element inflates towards a position between the two adjacent seats 19,20. This is the position shown in FIG. 3. A first side face 25 of the inflatable element is adjacent the first seat 19 and a second, opposed side face 26 is adjacent the second seat 20. It is to be appreciated that, when in the inflated position, the upper part of the inflatable element and the central region 12 of each strap 8,9,10 is in contact with part of the roof 18 of the motor vehicle. Thus, when the inflatable element is inflated, the part of the inflatable element in contact with the roof 18 will not move upwardly and this ensures that the remainder of the inflatable element inflates downwardly from the roof 18 of the vehicle. This downward inflation of the inflatable element ensures the first opposed ends of the straps 8,9,10 are tensioned between the mounting lugs 21 and the central part 12 of the strap which is secured to the inflatable element and that the second opposed ends of the straps 8,9,10 are tensioned between the mounting lugs 22 and the central part 12 of the strap which is secured to the inflatable element. This tension provides a significant resistance to pivotal movement of the inflatable element about either set of mounting lugs 21 or 22.

The plurality of cells 17 assist in ensuring that the inflatable element itself is rigid. The tension in the straps assists in preventing as minimising any tendency for the inflatable element to pivot about the point where it touches the roof.

In a side impact or rollover situation, an occupant of either seat 19 or 20 impacts with a respective side face 25 or 26 of the inflatable element. If the adjacent seat is not occupied, the inflatable element will attempt to pivot about an axis at or adjacent the top of the inflatable element. This pivotal movement will be resisted by the tension in the straps between the respective mounting lugs 21,22 and the part of each strap 8,9,10 secured to the inflatable element.

Thus, when an occupant impacts with the inflatable element, the inflatable element will remain substantially in the position shown in FIG. 3 and will not pivot or deform to occupy a position where the occupant slides beneath the inflatable element such that the required degree of protection is not provided.

Thus, it is the combination of tension in the straps between the inflatable element and the mounting lugs 21 and 22 caused by part of the inflatable element contact on the roof combined with the rigidity of the inflatable element provided by the plurality of cells 17 that resists the pivotal movement and deformation of the inflatable element.

Figure 4:
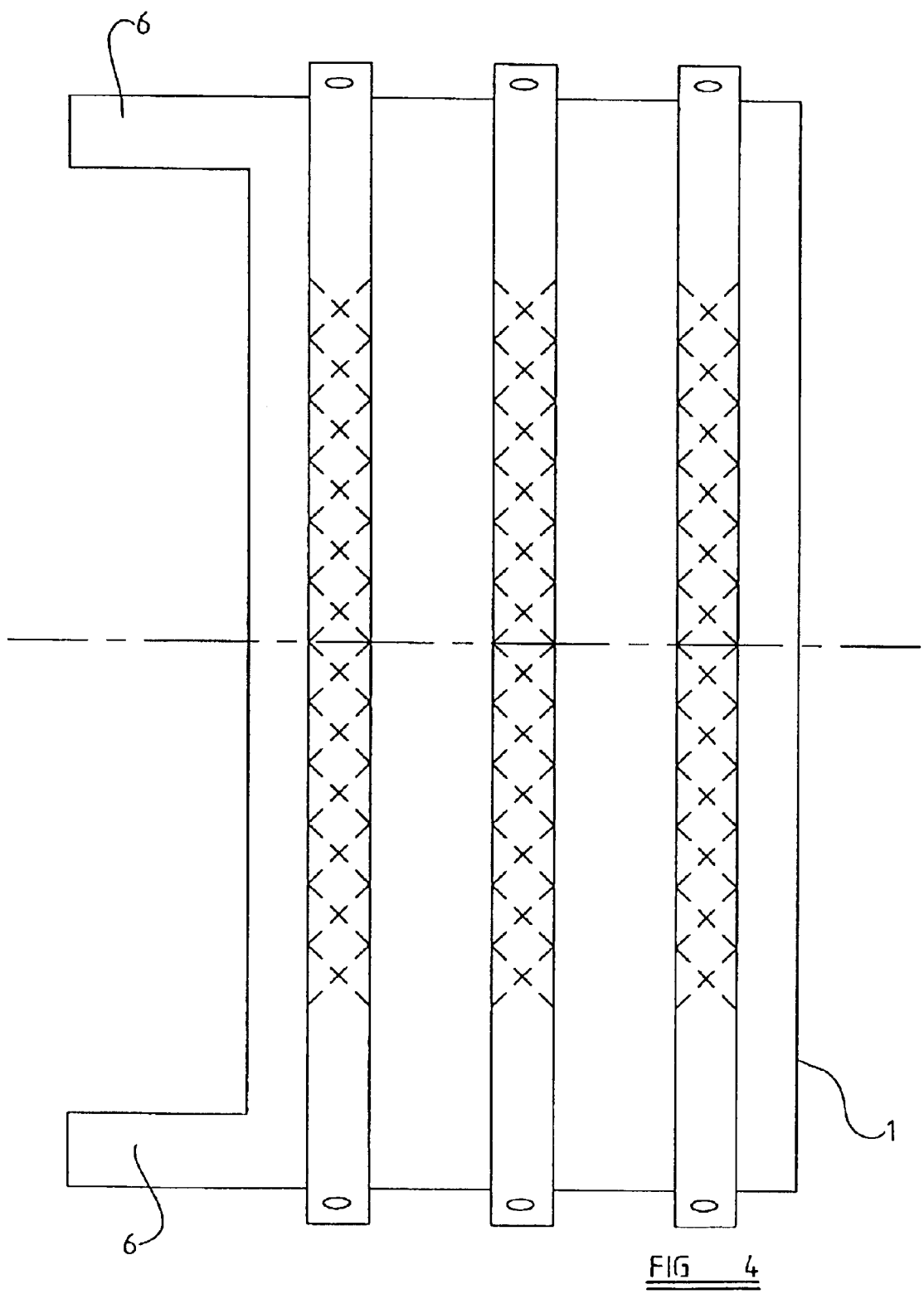
FIG. 4 is a plan view of a component used to fabricate an alternative embodiment of the inflatable element of the current invention with part of the component shown in phantom.

FIG. 4 shows an alternative embodiment of the inflatable element with like features being labelled by like numerals. In this embodiment, the rectangular sheet of fabric 1 is provided with a tab 6 adjacent each relatively short opposed end 4 and 5 such that the tabs 6 are located remote from the fold line 7 and extend perpendicularly away from the relatively long edge 2.

Each strap 8,9,10 extends transversely to the fold line right across the sheet of fabric 1 from the first relatively short end 4 to the second relatively short end 5. The ends of each strap 8,9,10 extend past the respective end 4 or 5 of the sheet 1. The central region 12 of each strap 8,9,10 is secured to a central part of the inflatable element adjacent the fold line 7 as has been previously described. The straps 8,9,10 are all of the same length, and the central regions 12 of the strap are all of the same length.

In this embodiment, the parts of the sheet 1 on either side of the fold line 7 are folded about the fold line 7 and secured together as has been previously described to form the inflatable element. The gas duct 15 is formed from the tabs 6 being secured together. In this embodiment, each strap 8,9,10 will extend right around the faces 25 and 26 of the inflatable element.

The inflatable element is provided with a plurality of internal tethers 27 which extend from one side face 25 of the inflatable element to the second side face 26. The ends of each tether 27 are secured to the respective side face 25 or 26 of the inflatable element by stitching, adhesive or welding. In an accident situation, it is envisaged that the tether 27 becomes tensioned as the inflatable element extends downwardly from the roof 18, the tension in the tether 27 ensuring that the inflatable element inflates to an appropriate shape. It is envisaged that a plurality of tethers spaced axially along the inflatable element could be used.

Figure 5:
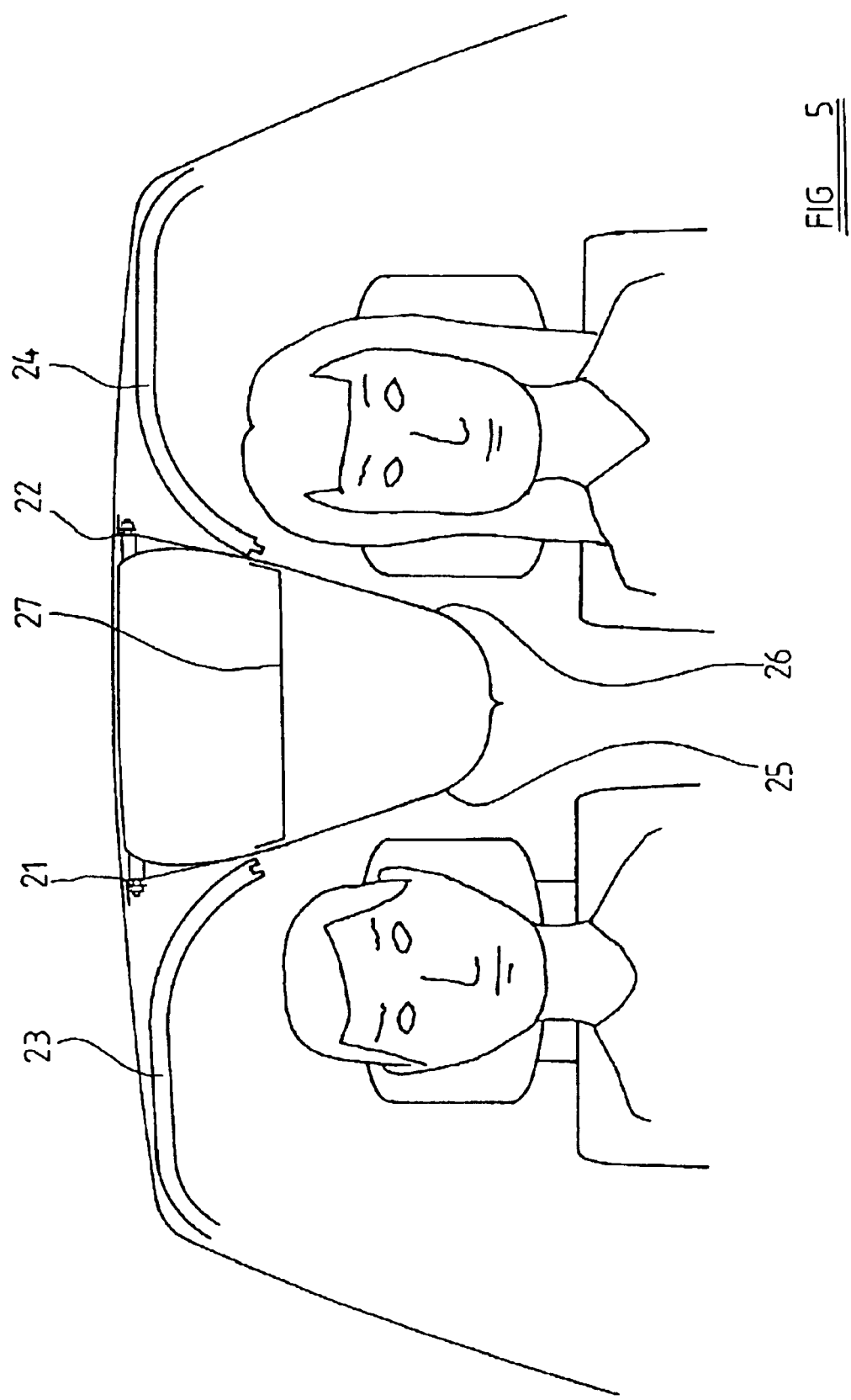
FIG. 5 is a part-sectional front view of the inflatable element of FIG. 4 when mounted in a motor vehicle, with the inflatable element in an inflated condition.

As shown in FIG. 5, the inflatable element is mounted in the roof 18 of the vehicle as has been described above and will operate, in a side impact or rollover situation in a manner as has been described above. Again, the first and second end of each strap which extend between the respective set of mounting lugs 21 and 22 and the central region 12 of each strap secured to the inflatable element will be tensioned by the upper part of the inflatable element being in contact with the roof of the vehicle. This tension, combined with the tether 27, will resist pivotable movement of the inflatable element about either set of lugs when an occupant of one of the seats 19 and 20 impacts with the inflatable element.

In the present specification "comprise" means "includes or contains" and "comprising" means "including or containing".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An airbag arrangement in a motor vehicle, the airbag arrangement comprising an inflatable element having two opposed side faces, each side face being provided with mounting means at least at points spaced apart axially of the vehicle along the inflatable element, and which extend to mounting points in the roof of the motor vehicle between two adjacent seats of the motor vehicle, the mounting points being transversely spaced apart, the arrangement being such that, when inflated, the inflatable element extends down from the roof of the motor vehicle with part of the inflatable element between the mounting points in contact with part of the roof of the vehicle, the inflatable element contacting the roof so that the mounting means associated with each side face are tensioned.

2. The arrangement of claim 1, wherein the mounting means comprise at least two elongate straps, each strap having two opposed ends, each end being mounted on a respective mounting point in the roof of the vehicle, a central part of each strap being secured to part of the inflatable element.

3. The arrangement of claim 2, wherein the straps extend across the top of the inflatable element when the inflatable element is in an inflated condition.

4. The arrangement of claim 2, wherein the straps extend around the bottom of the inflatable element when the inflatable element is in an inflated condition.

5. The arrangement of claim 4, wherein each end of each strap is provided with a mounting eye and each mounting point in the roof of the vehicle comprises a mounting lug on which a respective mounting eye is secured.

6. The arrangement of claim 1, wherein the opposed side faces of the inflatable element are interconnected by means comprising at least one join line which defines a plurality of regions in the form of a plurality of cells.

7. An arrangement according to claim 1, wherein the opposed side faces are interconnected by means comprising at least one elongate tether extending between the two opposed side faces.

8. An arrangement according to claim 1, wherein the inflatable element is formed from a rectangular sheet of fabric folded about an axis to form two fabric halves, the two fabric halves being secured together about their periphery.

9. The arrangement of claim 8, wherein the halves are secured together by stitching.

10. The arrangement of claim 8, wherein the halves are secured together by welding.

11. The arrangement of claim 8, wherein the halves are secured together using adhesive.

* * * * *